United States Patent
Karanikolos et al.

(10) Patent No.: US 11,666,855 B2
(45) Date of Patent: Jun. 6, 2023

(54) MEMBRANE GAS SEPARATION UNDER MAGNETIC FIELD

(71) Applicant: Khalifa University of Science and Technology, Abu Dhabi (AE)

(72) Inventors: Georgios Karanikolos, Abu Dhabi (AE); Evangelos P. Favvas, Athens (GR); Nikolaos S. Heliopoulos, Athens (GR); Sergios K. Papageorgiou, Athens (GR)

(73) Assignee: Khalifa University of Science and Technology, Abu Dhabi (AE)

( * ) Notice: Subject to any disclaimer, the term of this patent is extended or adjusted under 35 U.S.C. 154(b) by 32 days.

(21) Appl. No.: 16/631,113

(22) PCT Filed: Jul. 14, 2017

(86) PCT No.: PCT/IB2017/054278
§ 371 (c)(1),
(2) Date: Apr. 20, 2020

(87) PCT Pub. No.: WO2019/012317
PCT Pub. Date: Jan. 17, 2019

(65) Prior Publication Data
US 2020/0338496 A1    Oct. 29, 2020

(51) Int. Cl.
*B01D 53/22* (2006.01)
*B01D 69/08* (2006.01)
*B01D 71/02* (2006.01)
*B01D 71/64* (2006.01)

(52) U.S. Cl.
CPC ......... *B01D 53/228* (2013.01); *B01D 53/229* (2013.01); *B01D 69/08* (2013.01); *B01D 71/021* (2013.01); *B01D 71/64* (2013.01); *B01D 2053/224* (2013.01); *B01D 2311/2607* (2013.01)

(58) Field of Classification Search
None
See application file for complete search history.

(56) References Cited

U.S. PATENT DOCUMENTS 3,140,993 A * 7/1964 Roberts .................. G01R 33/60
                                              208/251 R
4,704,139 A * 11/1987 Yamamoto ............. B01D 53/22
                                              128/205.11
(Continued)

FOREIGN PATENT DOCUMENTS

CN    101754796 A    6/2010
CN    103846017 A    6/2014
(Continued)

OTHER PUBLICATIONS

English language machine translation for DE 19753795 A1. Retrieved from translationportal.epo.org on Aug. 31, 2021. (Year: 2021).*
International Search Report issued in connection with PCT Application No. PCT/IB2017/054278 dated Dec. 29, 2017.
Office Action issued in connection with Application No. 2017800946833 dated Sep. 18, 2021.
(Continued)

*Primary Examiner* — Jason M Greene
(74) *Attorney, Agent, or Firm* — Dennemeyer & Associates LLC (57) ABSTRACT

Apparatus, methods and uses for separating gas mixtures of at least two different gases under magnetic field and employing a membrane are described.

14 Claims, 4 Drawing Sheets

(56) References Cited

U.S. PATENT DOCUMENTS

| | | | | |
|---|---|---|---|---|
| 4,713,292 | A * | 12/1987 | Takemura | B01D 69/08 210/490 |
| 5,181,940 | A * | 1/1993 | Bikson | B01D 69/08 95/47 |
| 5,238,547 | A | 8/1993 | Tsubouchi et al. | |
| 5,925,168 | A | 7/1999 | Judkins et al. | |
| 6,500,233 | B1 * | 12/2002 | Miller | B01D 69/148 502/4 |
| 2009/0148659 | A1 * | 6/2009 | Ishiodori | B01D 69/08 264/48 |
| 2010/0212503 | A1 * | 8/2010 | Yoshimune | B01D 71/021 96/10 |
| 2015/0210816 | A1 * | 7/2015 | Groth | B01D 67/0011 525/186 |
| 2015/0314244 | A1 * | 11/2015 | Guzman Lucero | B01D 53/228 95/47 |

FOREIGN PATENT DOCUMENTS

| | | | |
|---|---|---|---|
| CN | 104254384 A | 12/2014 | |
| DE | 19753795 A1 * | 6/1999 | ............ B01D 53/22 |
| WO | 2017145432 A1 | 8/2017 | |

OTHER PUBLICATIONS

Office Action issued in connection with Application No. 202017005480 dated Jul. 26, 2021.

Chinese office action for related application No. 2017800946833 dated Sep. 21, 2022.

Search report for Chinese office action for related application No. 2017800946833 dated Sep. 14, 2022.

"Manual for Metrology Testing" editing committee in "Manual for Metrology Testing vol. 13 chemistry" pp. 660-661; Issue date: Aug. 31, 1997.

* cited by examiner

MEMBRANE GAS SEPARATION UNDER MAGNETIC FIELD

CROSS-REFERENCE TO RELATED APPLICATIONS

This is a 35 U.S.C. 371 National Stage Patent Application of International Application No. PCT/IB2017/054278, filed Jul. 14, 2017, which is hereby incorporated by reference in its entirety.

The present invention relates to apparatus, methods and uses for separating gas mixtures of at least two different gases into the respective components under magnetic field and by employing a membrane.

BACKGROUND

The sensitivity of certain gases to magnetic field has been demonstrated long ago, yet application of this principle to membrane-based separation of various gas mixtures has not been thoroughly investigated up to now.

The repulsive or attractive forces induced by magnetic field could act selectively on mixtures, such as oxygen, nitrogen, or carbon dioxide-containing gases, which exhibit high magnetic susceptibility. Faraday reported first in 1847 that a bubble of oxygen gas is attracted to the center of a strong magnetic field (J. Tyndall, Faraday as a Discoverer, London: Longmans, Green, and Co., (1868) 108-119). About 100 years later, Pauling, Wood, and Sturdivant developed a paramagnetic oxygen analyzer based on this phenomenon to determine the partial pressure of oxygen in the air (L. Pauling, R. E. Wood, J. H. Sturdivant, An instrument for determining the partial pressure of oxygen in a gas, J. Amer. Chem. Soc. 68 (1946) 795-798).

In 1989, S. Ueno observed the quenching of flame that was created by a candle located between two magnetic poles upon onset of the magnetic field, and introduced a model called "magnetic curtain" to explain the phenomenon (S. Ueno, Quenching of flames by magnetic fields, J. Appl. Phys. 65 (1989) 1243). In two successive papers, Wakayama examined the behavior of gas flow under a gradient magnetic field and suggested that any gas group containing more than 30% oxygen was attracted by a magnetic field and acted like a magnetic fluid, in contrast to nitrogen that escaped from a relatively high magnetic field, and to air on which no magnetic effect was observed (N. I. Wakayama, Behavior of gas flow under gradient magnetic fields, J. Appl. Phys. 69 (1991) 2734-2736 and N. I. Wakayama, Magnetic Promotion of Combustion in Diffusion Flames, Combust. And Flame 93 (1993) 207-214).

Tagawa et al. (T. Tagawa, H. Ozoe, K. Inoue, M. Ito, K. Sassa, S. Asai, Transient characteristics of convection and diffusion of oxygen gas in an open vertical cylinder under magnetizing and gravitational forces, Chem. Engin. Sci. 56 (2001) 4217-4223) in 2001 studied the effect of magnetic field on transient convection and diffusion of pure oxygen gas through a vertical cylinder based on the experiment by Pauling, Wood and Sturdivant mentioned above, and presented a numerical approximation describing the phenomenon based on the Wakayama model (N. I. Wakayama, H. Ito, Y. Kuroda, O. Fujita, K. Ito, Magnetic support of combustion in diffusion flames under microgravity. Combustion and Flame, 107 (1996) 187-192). Gwak et al., in 2005, applied this idea on γ-Fe2O3/silica membranes and studied the effect of magnetic field for O2/N2 mixtures (J. Gwak, A. Ayral, V. Rouessac, K. H. Kim, J-C. Grenier, L. Cot, J-H. Choy, Porous ceramic membranes exhibiting ferri/ferromagnetic properties for separation, Sep. and Purif. Techn. 46 (2005) 118-124). However, no separation potential by the magnetic effect was demonstrated using the fabricated mesoporous membranes, which may be attributed to the possibility that such an effect could not be observed in large-diameter pores.

Two years later, Strzelewicz and Grzywna examined further the separation of O2/N2 in the presence of magnetic field (A. Strzelewicz, Z. J. Grzywna, Studies on the air membrane separation in the presence of a magnetic field, J. Membr. Sci. 294 (2007) 60-67) taking into account the Smoluchowski equation (Z. J. Grzywna, A. Michalec, From a Clannish random walk to generalized Smoluchowski equation, Acta Phys. Pol. B 35(4) (2004) 1463-1470) and a simple diffusion relation for nitrogen in air. This theoretical approximation was applied in a composite neodymium powder/ethylcellulose membrane with and without magnetic field indicating that air enrichment in oxygen can be achieved by application of magnetic field, with good agreement between theoretical predictions and preliminary experiments.

Rybaka et al. followed up recently by investigating 2/N2 separation using the magnetic neodymium powder/ethyl cellulose polymeric membranes and reported an almost 56% of oxygen enrichment in one permeation run under 400 Gauss (40 mT) magnetic field (A. Rybaka, Z. J. Grzywna, W. Kaszuwara, On the air enrichment by polymer magnetic membranes, J. Membr. Sci. 336 (2009) 79-85).

U.S. Pat. No. 5,925,168 to Judkins et al. describes a method for separating gases or other fluids which involves placing a magnetic field on a monolithic carbon fiber composite sorption material to more preferentially attract certain gases or other fluids to the sorption material to which a magnetic field is applied.

U.S. Pat. No. 4,704,139 to Yamamoto et al. describes a method of separating gases which includes: a step which introduces into a separating cell a mixture gas that contains paramagnetic gases and non-paramagnetic gases, and which separates the paramagnetic gases and the non-paramagnetic gases from the mixture gas via a permeable membrane in the separating cell; and a step which applies a magnetic field to a gas stream of the mixture gas nearly at right angles therewith to form a high gradient magnetic field region, so that the paramagnetic gases and the non-paramagnetic gases are separated from the mixture gas by the high gradient magnetic field. Further described is an apparatus for separating gases which includes: a separating cell having a permeable membrane arranged inside thereof; and a magnetic field generating device which applies a magnetic field nearly at right angles to a gas stream of a mixture gas that passes through the permeable membrane in the separating cell and that contains paramagnetic gases and non-paramagnetic gases, so that a high gradient magnetic field region is formed near a magnetic support member that corresponds to the permeable membrane. The permeable membrane is preferably made from silicone polymer.

The technical problem that this invention targets is separation of mixtures. The processes currently in use are highly energy demanding. In fact, approximately 15% of the global energy (~60×10^15 Btu/yr) is currently used for separation and purification, out of which, only a small fraction is dedicated to the actual separation due to thermodynamic limitations (e.g. ~10% efficiency in distillation columns). To this extent, energy-conservation strategies relying on replacing or combining thermally driven separation processes with more efficient ones need to be developed.

SUMMARY OF THE INVENTION

It is an object of the present invention to provide an apparatus and a method for separating gas mixtures, i.e. mixtures of at least two different gases, using magnetic field, as well as a respective use of a membrane for separating such gas mixtures.

It is a further object of the present invention to provide a respective apparatus, a method and a use which lead to an improved selectivity of the separation.

It is another object of the present invention to provide an apparatus, a method and a use that overcome present drawbacks of membrane performance, especially caused by gas flow direction through membrane gaps and not pores, pore orientation, membrane thickness, uniform pore morphology and functionality.

It is moreover an object of the present invention to allow for energy-savings in gas separation by using an advantageous apparatus, method and use, respectively, for achieving the desired gas separation.

In order to achieve one or more of the mentioned objects, the present invention provides an apparatus for the separation of a gas mixture of at least two different gases, wherein the apparatus comprises a first chamber and a second chamber, wherein the first chamber has at least one inlet for feeding the gas mixture into the first chamber, wherein the first chamber has at least one outlet for retrieving at least part of one of the at least two gases, wherein the second chamber has at least one outlet for retrieving at least part of another one of the at least two gases, wherein the first chamber and the second chamber are in contact and separated by a membrane, wherein the membrane is surrounded by a magnet. The magnet is especially such that an external magnetic field can be or is applied to the membrane.

The membrane can for example be a polyimide-based membrane. In a particular embodiment, a polyimide-based membrane is made as hollow fiber, wherein it is especially preferred that the hollow fibers have a basically circular wall and a void inside the basically circular wall. In a particularly advantageous embodiment the basically circular wall has a wall thickness as determined by Scanning Electron Microscopy (SEM) in the range of 130 to 160 µm. According to a preferred embodiment, the polyimide-based membrane has been carbonized to yield carbon hollow fiber membrane.

In one preferred embodiment of the invention, the magnet is either a permanent magnet or an electromagnet. It is also preferred that the magnet, which is preferably a cylindrical magnet, generates a magnetic field of 40 mT (400 Gauss) or more.

In order to achieve one or more of the mentioned objects, the present invention further provides a method for separating a gas mixture of at least two gases which is carried out in an apparatus as outlined before and further in the subsequent description. In a preferred embodiment of this method the gas mixture of at least two gases is selected from the following mixtures of two gases: $H_2/CH_4$, $He/CH_4$, $H_2/CO_2$, $CO_2/N_2$, $He/CO_2$, $CO_2/CH_4$, and $He/O_2$.

Likewise in order to achieve one or more of the mentioned objects, the present invention further provides a method for separating a gas mixture of at least two gases, wherein the gas mixture is fed into a first chamber of a gas-separating apparatus via a first inlet, wherein at least part of one of the at least two gases is retrieved from the first chamber via at least one outlet of the first chamber, wherein the first chamber and a second chamber of the gas-separating apparatus are in contact and are separated by a membrane, wherein at least part of another one of the at least two gases is retrieved from the second chamber via at least one outlet of the second chamber, wherein the membrane is surrounded by a magnet, whereby an external magnetic field is applied to the membrane.

In a preferred embodiment of this method the gas mixture of at least two gases is selected from the following mixtures of two gases: $H_2/CH_4$, $He/CH_4$, $H_2/CO_2$, $CO_2/N_2$, $He/CO_2$, $CO_2/CH_4$, and $He/O_2$.

Moreover, in order to achieve one or more of the mentioned objects, the present invention also provides a use of a membrane which is surrounded by a magnet such that an external magnetic field can be or is applied to the membrane for separating a gas mixture of at least two gases. In a preferred embodiment of this use the gas mixture of at least two gases is selected from the following mixtures of two gases: $H_2/CH_4$, $He/CH_4$, $H_2/CO_2$, $CO_2/N_2$, $He/CO_2$, $CO_2/CH_4$, and $He/O_2$. In a preferred embodiment the membrane can also contain magnetic particles. These particles can act as small magnets inserted in the membrane matrix or deposited on its surface. In the case where external magnetic field is also applied, the magnetic behavior of the magnetic particles can be manipulated by the external magnetic field, thus allowing for tuning of the membrane functionality in two ways, i.e. due to the external magnetic field as well as the internal magnetic particles.

BRIEF DESCRIPTION OF THE DRAWINGS

The present invention will be described with reference to the accompanying drawings of which.

DETAILED DESCRIPTION OF THE INVENTION

The present invention inter alia provides an apparatus for the separation of a gas mixture of at least two different gases, wherein the apparatus comprises a first chamber and a second chamber, wherein the first chamber has at least one inlet for feeding the gas mixture into the first chamber, wherein the first chamber has at least one outlet for retrieving at least part of one of the at least two gases, wherein the second chamber has at least one outlet for retrieving at least part of another one of the at least two gases, wherein the first chamber and the second chamber are in contact and separated by a membrane, wherein the membrane is surrounded by a magnet. The magnet is especially such that an external magnetic field can be or is applied to the membrane.

This apparatus allows for a reliable and effective separation of gas mixtures, in particular of mixtures of at least two different gases. The used membrane improves the selectivity of the separation and at the same time overcomes disadvantages previously often associated with membranes in gas separation, especially insufficient membrane performance which is regularly caused by gas flow direction through membrane gaps and not pores, pore orientation, membrane thickness, uniform pore morphology and functionality. Furthermore, using the apparatus according to the present invention allows to reduce the energy required for the desired gas separation.

In the context of the present invention a membrane is made from a material which comprises an imide polymer, i.e. a polyimide. The material or material blend may comprise additional materials, especially further polymers, such as polyaniline. Moreover, the material may be further treated, especially carbonized, to yield carbon fibers. Furthermore, the material may be any type of membrane suitable for mixture separation, including but not limited to organic, inorganic, polymeric, ceramic, mixed matrix, composite, and hybrid membranes.

Figure 3:
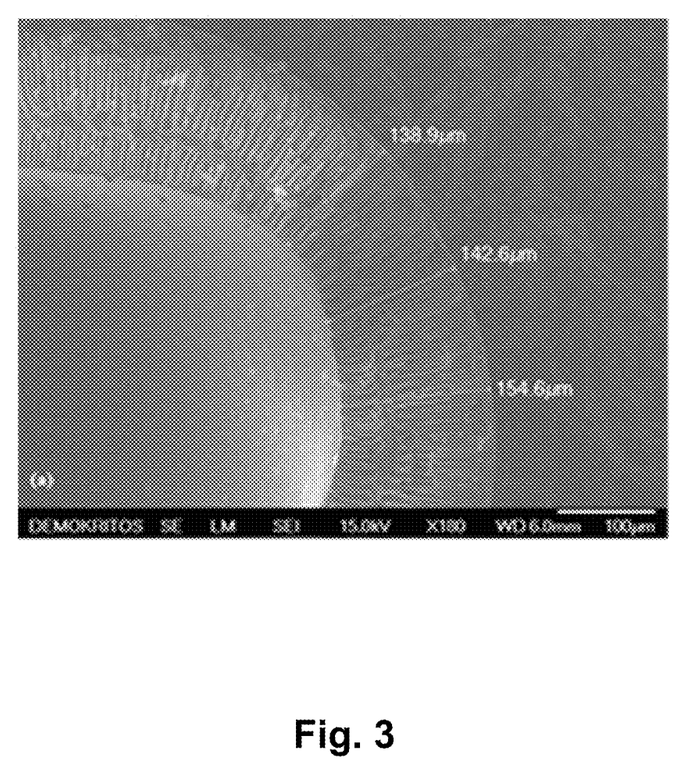
FIG. 3 is a cross sectional view of the hollow fiber membranes used in the present invention.
Figure 4:
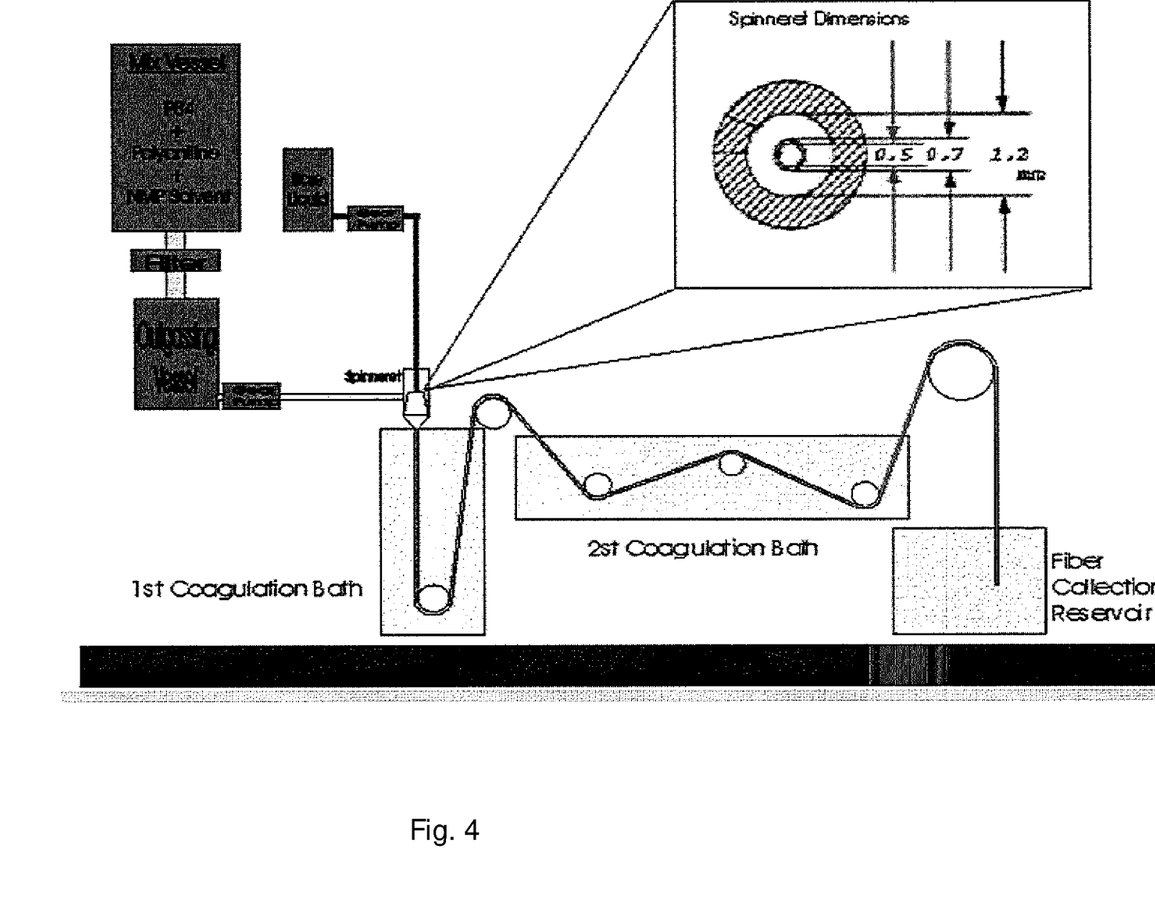
FIG. 4 shows a hollow fiber spinning setup for a dry/wet phase inversion process.

It has been found that particularly good separation results are achievable when the membrane is made of hollow fibers. In a particular embodiment within this context, an advantageous hollow fiber has a basically circular wall and a void inside the basically circular wall. Basically circular means that the wall will not necessarily have a circular cross-section which is circular in a mathematically strict sense, but one which is considered circular in the concerned technical field, as illustrated for example by FIG. 3. In order to achieve a good separation result, the basically circular wall has preferably a wall thickness as determined by Scanning Electron Microscopy (SEM) in the range of 130 to 160 μm. Especially for the concerned gas mixtures to be separated, it is further beneficial that the polyimide-based membrane is made of a commercial polyimide, and/or that the polyimide-based membrane has been carbonized to yield carbon membrane.

In order to achieve a reliable, continuously stable and homogenous magnetic field, it is preferred that the magnet used in this invention is a permanent magnet. For an enhanced flexibility and the possibility to easily alter the magnetic field strength, it is advantageous to employ an electromagnet. In either case, the magnet is preferably a cylindrical magnet which allows a geometrically homogenous construction of the separation apparatus. It has furthermore proven advantageous that the magnet generates a magnetic field of 40 mT (400 Gauss) or more in order to achieve a desired ratio of separation of the gases contained in the treated gas mixture.

An advantageous separation method for separating a gas mixture of at least to gases into its components according to the invention is a method for separating a gas mixture of at least two gases which is carried out in an apparatus as outlined herein. A separation method as such as provided by the invention can be a method for separating a gas mixture of at least two gases, wherein the gas mixture is fed into a first chamber of a gas-separating apparatus via a first inlet, wherein at least part of one of the at least two gases is retrieved from the first chamber via at least one outlet of the first chamber, wherein the first chamber and a second chamber of the gas-separating apparatus are in contact and are separated by a polyimide-based membrane, wherein at least part of another one of the at least two gases is retrieved from the second chamber via at least one outlet of the second chamber, wherein the membrane is surrounded by a magnet, whereby an external magnetic field is applied to the membrane. Similarly useful is a use according to the invention which is a use of a polyimide-based membrane which is surrounded by a magnet such that an external magnetic field can be or is applied to the membrane for separating a gas mixture of at least two gases. All these methods and uses allow for a reliable and effective separation of gas mixtures, in particular of mixtures of at least two different gases. The aforementioned methods and uses improve the selectivity of the separation and at the same time overcome disadvantages previously often associated with membranes in gas separation, especially insufficient membrane performance which is regularly caused by gas flow direction through membrane gaps and not pores, pore orientation, membrane thickness, uniform pore morphology and functionality. Furthermore, the aforementioned methods and uses of the invention allow to reduce the energy required for the desired gas separation.

It has been established that particularly good separation results for the aforementioned methods and uses of the invention can be achieved when the separated gas mixture is selected from one of $H_2/CH_4$, $He/CH_4$, $Hz/CO_2$, $CO_2/N_2$, $He/CO_2$, $CO_2/CH_4$, and $He/O_2$.

In general, the invention teaches a method of enhancing the performance of gas separation membranes for gas mixtures (specifically separation of He, Hz, $CO_2$, $O_2$, $N_2$ and $CH_4$. gas mixtures) and an apparatus for carrying out the enhanced gas separation technique, which utilizes the addition of an external magnetic field surrounding a gas separation apparatus.

The invention targets the enhancement of membrane performance through application of external magnetic field.

The targeted enhancements are: changes in permeability and selectivity performance of the membranes due to externally applied magnetic field, enhancement of membrane performance to overcome present drawbacks of membrane performance, caused by gas flow direction through membrane gaps and not pores, pore orientation, membrane thickness, uniform pore morphology and functionality (which currently limit the scale up of membranes).

The present invention has the potential to overcome barriers in current membrane technology.

Traditional separation techniques are highly energy consuming and lack efficiency. For example liquid amine absorption used to separate $CO_2$ or $H_2S$ from gas mixtures suffers from slow kinetics due to diffusion limitations in bulk amine solutions, slippage of the liquid to the atmosphere, foaming etc., while it entails a highly energy consuming regeneration step. Employment of solid adsorbents or membranes that would separate mixtures based on preferential adsorption and/or sieving of molecules with minute size and shape differences, could lead to energy-efficient, high-resolution molecular separation processes (R. W. Baker, Membrane Technology and Applications, 2nd Edition, John Wiley & Sons, Ltd, 2004, England). Two major mechanisms for membrane separation dominate, namely, molecular sieving, where the size of membrane pores restrict the passage of molecules with certain size and shape while allowing others having smaller dimensions, and sorption separation, where pore functionalities interact with certain molecules that exhibit higher affinity than others thus inducing selectivity (K. Varoon, X. Zhang, B. Elyassi, D. D. Brewer, M. Gettel, S. Kumar, J. A. Lee, S. Maheshwari, A. Mittal, C-Y. Sung, M. Cococcioni, L. F. Francis, A. V. McCormick, K. A. Mkhoyan, M. Tsapatsis, Synthesis of self-pillared zeolite nanosheets by repetitive branching, Science 334 (2011) 72-75). However, intensive efforts are being dedicated to overcome challenges associated with fabrication and operation of membranes, the function of which is based on the aforementioned mechanisms. Specifically, of particular importance is the fabrication of defect-free membranes so that flow is directed exclusively through the pores of the membrane and not through gaps that can sacrifice selectivity, a challenge that becomes even more dominant when scaling up is attempted towards fabrication of large membrane areas as required by industrial applications. Other issues such as pore orientation, membrane thickness, uniform pore morphology and functionality also limit the use of membranes at industrial scale.

The present inventors found solid evidence that magnetic field can enhance the performance of membranes for separation of gas mixtures. The concept can have great impact on the field of mixture separations at industrial scale. The inventors tested the concept by studying various gases passing through a membrane, and the inventors found that the permeance and selectivity performance of the membrane changed after applying external magnetic field depending on the type of gas molecules that are being separated. The inventors also found out that additional tuning of the membrane performance can be achieved after loading the membrane with magnetic particles. These particles can act alone or in conjunction to external magnetic field, the latter having the ability to alter the magnetic properties of the particles, which in turn alter the transport properties of the gas molecules of the mixture to be separated. This is attributed to the magnetic susceptibility of the molecules, and the interaction of the molecules and the particles with the applied magnetic field. These data are available and are described below.

The repulsive or attractive forces induced by magnetic field could act selectively on mixtures of gases, e.g. consisting of oxygen, nitrogen, or carbon dioxide that exhibit high magnetic susceptibility, thus providing an additional mode of tuning the performance of microporous membranes. The concept is tested herein using polymeric hollow fibers (HFs), which were produced from a commercial co-polyimide precursor via phase inversion, and carbon HFs prepared by carbonization of the polymeric ones. Separation performance of the above membranes was evaluated and compared to performance under the presence of an external magnet surrounding the membrane cell for a variety of gases under the effect of magnetic field. Permeation through the membranes of a series of gas molecules was carried out, namely He, Hz, $CO_2$, $O_2$, $N_2$ and $CH_4$. The results showed that the introduced magnetic field modified the gas separation properties of the membranes. The highest enhancement of permselectivity values were obtained for the carbon HFs under magnetic field in the cases of $Hz/CH_4$ and $He/CH_4$.

Moreover, operation of the same membranes under magnetic field resulted in a 7-fold increase in $CO_2/CH_4$ selectivity. The membranes that were used as a case study were prepared according to previous reports involving some of the inventors (E. K. Chatzidaki, E. P. Favvas, S. K. Papageorgiou, N. K. Kanellopoulos, N. V. Theophilou, New Polyimide—Polyaniline Hollow Fibers: Synthesis, Characterization and behavior in Gas Separation, Europ. Polym. J. 43 (2007) 5010-5016, and E. P. Favvas, E. P. Kouvelos, G. E. Romanos, G. I. Pilatos, A. Ch. Mitropoulos, N. K. Kanellopoulos, Characterization of highly selective microporous carbon hollow fiber membranes prepared from a commercial co-polyimide precursor, J. of Porous Materials 15, 2008, 625-633). More specifically, the preparation route described below was followed The precursor was an asymmetric hollow fiber prepared from commercial P84 co-polyimide. P84 (BTDA-TDI/MDI) was obtained from Lenzing and is a thermally stable co-polyimide of 3,3'4,4'-benzophenone tetracarboxylic dianhydride and 80% methylphenylene-diamine+20% methylene diamine Its chemical structure is shown following (in Formula 1), while the calculated density is about 1.30 g/cm3. The glass transition temperature (Tg) of this polymer is 588 K as determined by differential scanning calorimetry (heating rate of 10 K/min) under dry nitrogen environment.

Formula 1

Chemical structure of P84 co-polyimide.

The polymer was dried overnight at 393 K under vacuum prior to be used for the production of the hollow fibers. The solvent applied was N-methyl-pyrolidone (NMP). The P84 polymeric hollow fiber precursors were prepared by the dry/wet phase inversion process in a spinning set-up. The spinning dope, consisting only of P84 polymer and NMP as solvent, was mixed overnight at 323 K in a stainless-steel vessel of 3 liters in order to prepare a homogeneous solution. In a second step the solution was filtered through a 15 μm metal filter to remove impurities existing in the raw polymers. Both vessels as well as the spinneret were thermostated at 323 K in order to facilitate the flow of the polymer solution. After filtering, the dopes were allowed to degas inside a second stainless steel vessel for 2 days. The bore liquid was a degassed mixture of NMP and deionized water. The polymer solution (28.5% w/w P84/NMP) and bore fluid (70% w/v $NMP/H_2O$) were simultaneously pumped through a tube-in-orifice spinneret using gear pumps. The i.d. of the spinneret was 500 μm and the o.d. 700 μm. The extruded fibers passed first through a 6 centimeters air gap before entering to the coagulation bath, which was filled with tap water at room temperature. The nascent fibers were oriented by means of two guiding wheels and pulled by a third wheel into a collecting reservoir. In order to remove residual NMP, the produced fibers were washed with tap water overnight and then solvent exchanged in plastic containers with ethanol for 6 h.

Permeation measurements of various gases were performed using the variable pressure method in a high-pressure (70 bar) stainless steel permeation rig, the characteristics and operation of which are described in S. F. Nitodas, E. P. Favvas, G. E. Romanos, M. A. Papadopoulou, A. Ch. Mitropoulos, N. K. Kanellopoulos, Synthesis and Characterization of Hydrogen Selective Silica-based Membranes, J. Porous Mater. 15 (2008) 551-557. More specifically, the measurements were performed following the protocol below.

Figure 2:
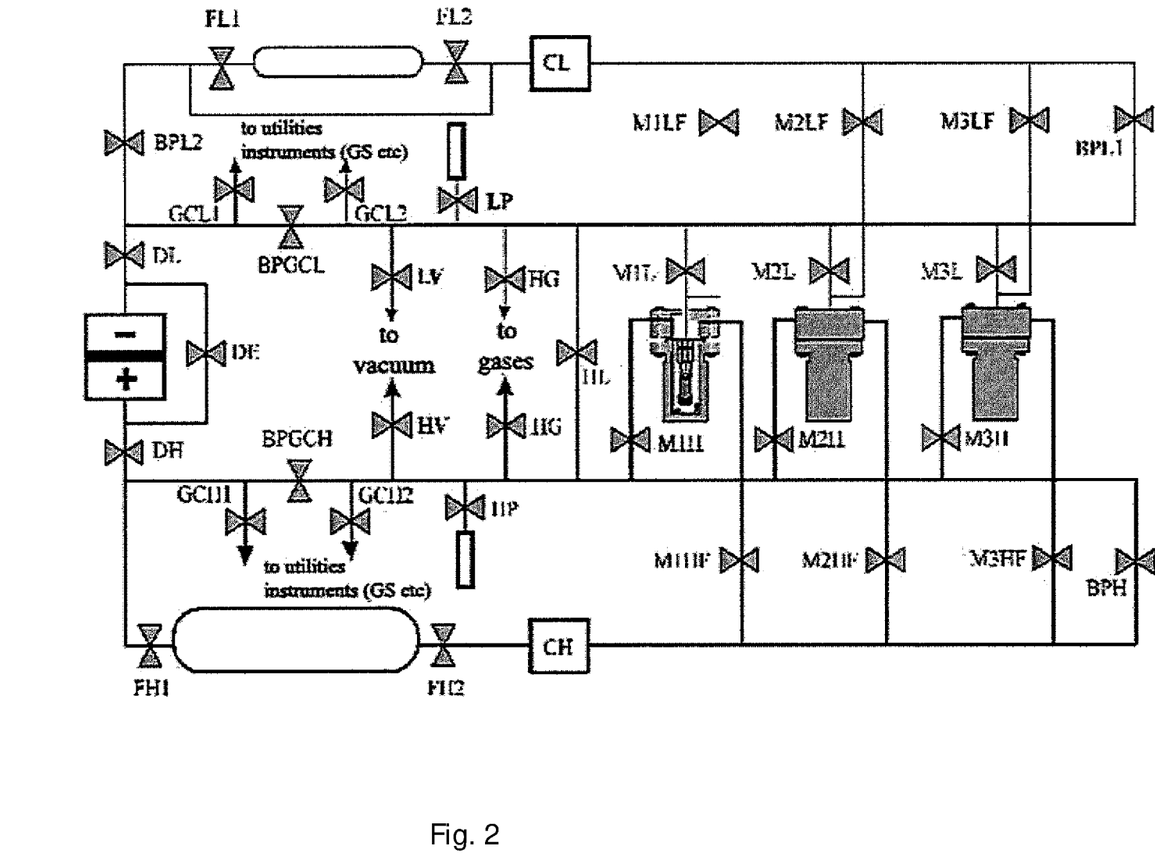
FIG. 2 shows an apparatus used in the present invention for permeance measurements.

The separation of various gas mixtures gases was determined for the used membranes at a temperature of 373 K and an absolute pressure of 2 bar. The permeance measurements were conducted in a homemade apparatus (laboratory MESL, Institute of Nanoscience and Nanotechnology, NCSR "Demokritos"), which is depicted in FIG. 2. The device can operate under high vacuum conditions ($10^{-3}$ Torr) and its feed pressure can reach 70 bar. The permeance apparatus consists of the following parts:
1. the high pressure area;
2. the low pressure area; and
3. the membrane area.

A bottle of high volume (5 L) is placed in the high pressure area in order to maintain the experimental conditions at the set-point value, i.e. in the case of small pressure drop. In the low-pressure area, there is the capability of volume selection that ensures the measurement of the pressure increase, independently of the permeance value. The apparatus is immersed in oil bath, which is maintained at constant temperature (±0.05 K) with the use of a PID thermostat (controller)-stirrer (Julabo E07). For the minimization of the temperature fluctuations, the area above the oil bath is thermally insulated and its temperature is regulated (±0.1 K) by an air circulator and a thermostat PD (CENON TSL 100 with supply-thermal protection unit CENON DP800). Concurrently, the room temperature is kept stable (±2 K) with the help of an air conditioner. The membranes were placed in the permeance apparatus and degassed at the maximum operating temperature (373 K).

Figure 1:
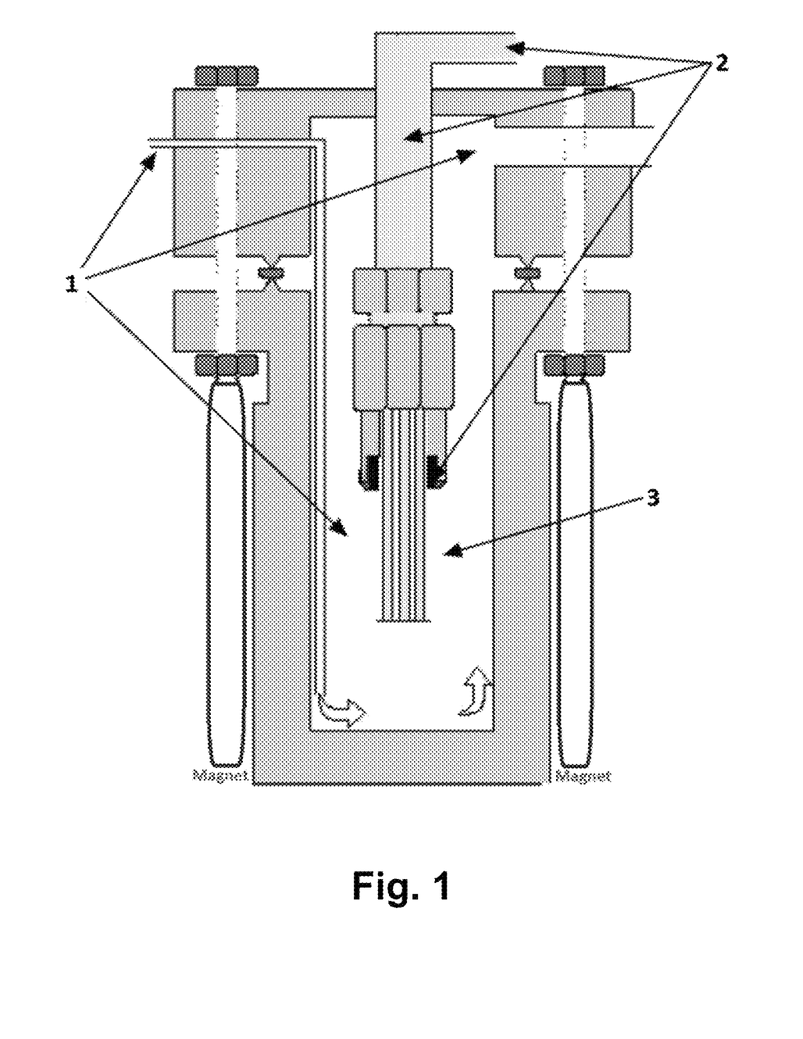
FIG. 1 is a cross sectional representation of the membrane cell used for the gas permeance experiments under application of external magnetic field.

The experiments were performed by continuously monitoring the pressure increase in the low-pressure side of the rig by means of a differential pressure transducer. These kinds of experiments, under the effect of external magnetic field, were performed by fixing a cylindrical permanent magnet around the permeation cell, as illustrated in FIG. 1, which is part of the overall apparatus used in the present invention for permeance measurements as shown in FIG. 2. More specifically, FIG. 1 is a cross sectional representation of the membrane cell used for the gas permeance experiments under application of external magnetic field, wherein 1 represents high pressure, 2 Represents low pressure, and 3 represents a hollow fiber membrane.

Permeability, K, (Barrer) and permeance, Pe (GPU), coefficients were calculated for membranes with accurate thickness of the separating layer and for membranes where this separating layer is not known with accuracy, respectively. The permeance measurements were conducted at room temperature for the carbon hollow fiber membranes (CHFMs). In addition, the effect of external magnetic field in both membranes was examined using a 400-Gauss cylindrical permanent magnet placed around the permeation cell containing the membrane. Decrease of permeance follows the increase of the kinetic diameter of the studied gas. This behavior indicates that the main separation mechanism is molecular sieving.

Table 1 shows the permeance results related to the carbon hollow fibers. For all cases, the studied membranes give molecular sieving characteristics with high selectivity coefficients. $N_2$ and $CH_4$, having the largest kinetic diameter among all gases tested, present very low permeance so as to be practically considered impermeable, confirming the molecular sieving mechanism. Experiments on the CHFMs revealed that application of external magnetic field affects the permeation behavior. Indeed, permeance was enhanced with application of the external magnet for all gases tested. The effect was stronger for $O_2$, where permeance almost doubled after exposure to the magnetic field.

TABLE 1

Room temperature permeance values for carbon hollow fiber membranes (CHF) and CHF under magnetic field.

| Gas | Kinetic Diameter (Å) | Permeance (GPU) CHFM | CHFM under magnetic field |
|---|---|---|---|
| He | 2.6 | 1.41 | 1.83 |
| $H_2$ | 2.89 | 1.29 | 1.58 |
| $CO_2$ | 3.3 | 0.012 | 0.0174 |
| $O_2$ | 3.46 | 0.0072 | 0.0133 |
| $N_2$ | 3.64 | 0.0009 | 0.0001 |
| $CH_4$ | 3.8 | 0.0009 | 0.0002 |

Table 2 illustrates the ideal selectivities (permselectivities calculated as the ratio of the permeances) in relation to the Knudsen factors for six pairs of gases, $H_2/CH_4$, $He/CH_4$, $H_2/CO_2$, $He/CO_2$, $CO_2/CH_4$, and $He/O_2$.

For the cases of $CH_4$ and $N_2$ in particular, the gases with the smaller permeance values (in the order of $10^{-4}$ GPU), the corresponding ideal selectivities are very high, confirming the molecular sieving diffusion mechanism. The drastically higher $He/CH_4$ and $H_2/CH_4$ separation factors compared to the $He/CO_2$ and $H_2/CO_2$ ones indicate that the mean pore size of the carbon matrix should be close to the kinetic diameter of methane (3.8 Å or 0.38 nm). The significant deviation of the observed selectivity values compared to respective Knudsen selectivities further confirms the ultramicroporous structure of the studied membranes, in analogy to permselectivity properties reported for zeolite membranes.

In the case of $CO_2/CH_4$ gas pair, the presence of the magnetic field increases the selectivity coefficient. A 7-fold increase is observed in particular for the CHFM fibers. This is the combined result of the enhancing effect of the magnetic field on the $CO_2$ permeance and the depressing action on the $CH_4$ permeance, as indicated by the respective permeance values reported in Table 1. In contrary, for the $He/CO_2$ and $H_2/CO_2$ pairs, the presence of the magnetic field results in reduction of the separation factors. The anisotropy in membrane performance induced by the effect of the external magnetic field action is better demonstrated by the $He/O_2$ pair, where selectivity of the CHF membranes is suppressed by applying the magnetic field.

TABLE 2

Room temperature ideal selectivities of the studied membranes compared to the respective Knudsen selectivity values.

| T = 298 K | $H_2/CH_4$ | $He/CH_4$ | $He/CO_2$ | $H_2/CO_2$ | $CO_2/CH_4$ | $He/O_2$ |
|---|---|---|---|---|---|---|
| Knudsen selectivity | 2.83 | 2.83 | 3.74 | 3.74 | 0.60 | 2.00 |
| CHFM | 1436.11 | 1569.89 | 120.76 | 110.47 | 13 | 195 |
| CHFM (under magnetic field) | 7897.50 | 9159.50 | 105.28 | 90.78 | 87 | 137 |

The present invention is of a great interest since it has the potential to overcome challenges in gas separation of current membrane or adsorption techniques, towards practical application in development of energy efficient separation processes applicable at industrial scale. It can also address one of the major challenges existing in membrane gas separation: how to overcome limitations of the Robeson upper bound. Specifically, of particular importance is the fabrication of defect-free membranes so that flow is directed exclusively through the pores of the membrane and not through gaps that can sacrifice selectivity, a challenge that becomes even more dominant when scaling up is attempted towards fabrication of large membrane areas as required by industrial applications. Other issues such as pore orientation, membrane thickness, uniform pore morphology and functionality also limit the use of membranes at industrial scale. The present invention has the potential to enhance performance of membranes even if the aforementioned hurdles cannot be overcome.

All industries treating or utilizing gases/gas mixtures can benefit from the technology, mainly the gas processing industry. Examples of application include $H_2S$ removal, $H_2$ purification, $CO_2$ capture, HC separation, $O_2$ purification, $CO_2$ recycle for EOR, etc.

The foregoing disclosure and showings made in the drawings are merely illustrative of the principles of this invention and are not to be interpreted in a limiting sense.

The invention claimed is:

1. Apparatus for the separation of a gas mixture of at least two different gases,
    wherein the apparatus comprises a first chamber and a second chamber,
    wherein the first chamber has at least one inlet for feeding the gas mixture into the first chamber,
    wherein the first chamber has at least one outlet for retrieving at least part of one of the at least two gases,
    wherein the second chamber has at least one outlet for retrieving at least part of another one of the at least two gases,
    wherein the first chamber and the second chamber are in contact and separated by a membrane,
    wherein the membrane is surrounded by a magnet,
    wherein the membrane is made of hollow fibers,
    wherein the hollow fibers are made by spinning,
    wherein the membrane is a polyimide-based membrane; and
    wherein the hollow fibers have a circular wall and a void inside the circular wall,
    wherein the circular wall has a wall thickness as determined by Scanning Electron Microscopy in the range of 130 to 160 µm.

2. The apparatus of claim 1, wherein the polyimide-based membrane has been carbonized.

3. The apparatus of claim 1, wherein the magnet is a permanent magnet.

4. The apparatus of claim 1, wherein the magnet is an electromagnet.

5. The apparatus of claim 1, wherein the magnet generates a magnetic field of 40 mT or more.

6. A method for separating a gas mixture of at least two gases which is carried out in an apparatus according to claim 1, the method comprising:
    passing the at least two gases through the membrane; and
    separating the at least two gases of the gas mixture at least partially based on their selective attraction or repulsion by a magnetic field as they permeate through the membrane.

7. The method of claim 6, wherein the gas mixture of at least two gases is selected from the following mixtures of two gases: $H_2/CH_4$, $He/CH_4$, $H_2/CO_2$, $He/CO_2$, $CO_2/N_2$, $CO_2/CH_4$, and $He/O_2$.

8. A method for separating a gas mixture of at least two gases,
    wherein the gas mixture is fed into a first chamber of a gas-separating apparatus via a first inlet,
    wherein at least part of one of the at least two gases is retrieved from the first chamber via at least one outlet of the first chamber,
    wherein the first chamber and a second chamber of the gas-separating apparatus are in contact and are separated by a membrane,
    wherein at least part of another one of the at least two gases is retrieved from the second chamber via at least one outlet of the second chamber,
    wherein the membrane is surrounded by a magnet, whereby an external magnetic field is applied to the membrane,
    wherein the membrane is made of hollow fibers,
    wherein the hollow fibers are made by spinning,
    wherein the membrane is a polyimide-based membrane, and
    wherein the hollow fibers have a circular wall and a void inside the circular wall,
    wherein the circular wall has a wall thickness as determined by Scanning Electron Microscopy in the range of 130 to 160 µm.

9. The method of claim 8, wherein the gas mixture of at least two gases is selected from the following mixtures of two gases: $H_2/CH_4$, $He/CH_4$, $H_2/CO_2$, $He/CO_2$, $CO_2/N_2$, $CO_2/CH_4$, and $He/O_2$.

10. A method of separating a gas mixture of at least two gases comprising:
    using a membrane surrounded by a magnet;
    applying an external magnetic field to the membrane;
    separating the at least two gases of the gas mixture at least partially based on their selective attraction or repulsion by a magnetic field as they permeate through membrane, wherein the membrane is made of hollow fibers,
wherein the hollow fibers are made by spinning,
wherein the membrane is a polyimide-based membrane, and
wherein the hollow fibers have a circular wall and a void inside the circular wall,
wherein the circular wall has a wall thickness as determined by Scanning Electron Microscopy in the range of 130 to 160 µm.

11. The use of claim 10, wherein the gas mixture of at least two gases is selected from the following mixtures of two gases: $H_2/CH_4$, $He/CH_4$, $H_2/CO_2$, $He/CO_2$, $CO_2/N_2$, $CO_2/CH_4$, and $He/O_2$.

12. The apparatus of claim 1, wherein the membrane contains magnetic particles, wherein these particles are inserted in a matrix of the hollow fiber membrane or deposited on a surface of the membrane.

13. The method of claim 8, wherein the membrane contains magnetic particles, wherein these particles are inserted in a matrix of the membrane or deposited on a surface of the membrane.

14. The method of claim 10, wherein the membrane contains magnetic particles, wherein these particles are inserted in a matrix of the membrane or deposited on a surface of the membrane.

* * * * *